United States Patent [19]
Wieland et al.

[11] Patent Number: 5,420,087
[45] Date of Patent: May 30, 1995

[54] REFRACTORY OR FIREPROOF BRICK AS TIN BATH BOTTOM BRICK

[75] Inventors: Klaus Wieland, Wiesbaden; Thomas Weichert, Hohenstein; Axel Eschner; Christoph Wöhrmeyer, both of Wiesbaden, all of Germany

[73] Assignee: Didier-Werke AG, Wiesbaden, Germany

[21] Appl. No.: 196,404

[22] Filed: Feb. 15, 1994

[30] Foreign Application Priority Data

Feb. 17, 1993 [DE] Germany .......................... 43 04 765.3

[51] Int. Cl.[6] ................................................ C04B 35/44

[52] U.S. Cl. .................................... 501/124; 501/125; 106/692

[58] Field of Search ................. 501/124, 125; 106/692

[56] References Cited

U.S. PATENT DOCUMENTS 4,536,216  8/1985  Kaluzhsky et al. .............. 106/692 X

*Primary Examiner*—Karl Group
*Attorney, Agent, or Firm*—Wenderoth, Lind & Ponack

[57] ABSTRACT

Refractory or fireproof brick useful as tin bath bottom brick, wherein the brick is made of a calcium aluminate having both coarse and fine grain sizes, and a binder made of calcium aluminate.

11 Claims, No Drawings

REFRACTORY OR FIREPROOF BRICK AS TIN BATH BOTTOM BRICK

BACKGROUND OF THE INVENTION

The present invention relates to a refractory or fireproof brick useful as a tin bath bottom brick in systems for manufacturing plate glass according to the float method.

In systems for manufacturing plate glass according to the float method, large-format refractory bricks having dimensions of 300×600×900 mm, for example, are used to receive the tin bath. The bricks form a flat bottom, on which the molten tin rests in a flat layer. The bricks used to date that are based on alumina-silica fireclay are subjected, during service at temperatures ranging from 800° to 1000° C., to corrosion due to the spalling of thin, dish-shaped layers and due to the crack formation and spalling at greater depths parallel to the hot brick surface. The dish-shaped spalling is produced by alkali oxides such as $Na_2O$, which emerge from the glass melt and migrate through the molten tin to the refractory material, thus resulting in an increase in volume in the formation of feldspars and feldspar derivatives in the fireclay brick.

The fireclay bricks used as tin bath bottom bricks are supposed to fulfill requirements with respect to strength, and in particular low permeability to gas and high alkali resistance. According to DE 40 13 294 A1, improved fireclay bricks are proposed using a silicate material with a high alkali content.

Refractory basic materials on the basis of sintered magnesia, fused magnesite, forsterite ($2MgO \cdot SiO_2$), or magnesiospinel ($MgO \cdot Al_2O_3$) have a high alkali resistance. However, use as a tin bath bottom brick would result in bricks whose high thermal expansion and thermal conductivity are regarded as shortcomings.

SUMMARY OF THE INVENTION

The object of the present invention is to provide a refractory, fireproof brick with high alkali resistance, high corrosion resistance, high infiltration resistance, low thermal conductivity and low thermal expansion.

This object is achieved by the brick being made of a calcium aluminate having coarse and fine grains and a binder made of calcium aluminate.

DETAILED DESCRIPTION OF THE INVENTION

That is, the present invention provides a refractory, fireproof brick comprising relatively coarse grains of calcium aluminate, relatively fine grains of calcium aluminate, and a calcium aluminate binder.

The grains of the brick preferably consist of sintered or fused calcium aluminate. The calcium aluminate can be, in particular, a porous material, which is obtained as so-called clinker during the conventional manufacture of sintered calcium aluminate. By breaking and grinding the clinker, the grains required for the brick according to the invention can be fabricated.

The bricks of the present invention are manufactured in a manner, as described in detail below, which results in the formation of a hydraulically bonded brick as an intermediate product. The hydraulically bonded brick is dried and annealed or fired at raised temperatures in order to remove the water that is bonded as a hydrate. The bricks are fired after drying at longer intervals, just prior to installing the bricks or putting the lining formed of the bricks into operation. In the latter case, the bricks of the lining are heated by way of the surface, facing the interior of the furnace.

More specifically, the present invention also provides a process for manufacturing a refractory, fireproof brick, which comprises mixing coarse grains of calcium aluminate having a grain size of 0.1 to 3 mm and fine grains of calcium aluminate having a grain size of less than 0.1 mm to prepare a mixture, wherein the fine grains are mixed in an amount of 10 to 30% by weight based on the weight of the mixture; adding water to the mixture; shaping the resultant mixture; storing the shaped mixture in a moist environment to cure the shaped mixture; drying the cured mixture; and firing the dried mixture.

The brick according to the invention is surprisingly stable against wear due to alkali oxide; the other properties of the brick also exhibit good and adequate values. The low thermal conductivity and the low thermal expansion of the brick are especially advantageous.

The refractory brick according to the invention is manufactured in such a manner that a mixture of coarse grained calcium aluminate in a grain size of 0.1 mm or greater, preferably ranging from 0.1 to 3 mm, and fine grained calcium aluminate in a grain size of below 0.1 mm, preferably 0.000 to less than 0.1 mm, is mixed with water, shaped, stored in a moist environment, dried and fired.

During the manufacture of the refractory brick made of the mixture comprising calcium aluminate and water, the consistency of the mixture can be adjusted in such a manner that large format bricks can be manufactured by means of compression. Following the compression operation, the compressed brick is removed from the mold and stored in a moist chamber until it has totally cured. Subsequently, the brick is dried and optionally mechanically processed, such as by grinding or drilling.

The mixture of calcium aluminate and water can also be adjusted to a consistency that can be rammed or vibrated. The mixture that is rammed or vibrated into molds remains in the mold until totally cured.

The brick preferably comprises 70 to 90% by weight of the coarse grains and 10 to 30% by weight of the fine grains, based on the weight of the brick.

Preferably, the proportion of the fine grained calcium aluminate below 0.1 mm in granularity ranges from 15 to 25% by weight.

During the manufacture of the bricks, a calcium aluminate-containing oxidic starting material is preferably used that contains 20–60% by weight CaO, 40–80% by weight $Al_2O_3$ and a maximum of up to 10% by weight in total of FeO, $Fe_2O_3$, $SiO_2$, MgO, and $TiO_2$, based on the weight of the starting material. Preferably the $SiO_2$ and iron oxide content, calculated as $Fe_2O_3$, are each less than 1.5% by weight. The $SiO_2$ and iron oxide content should be low in order to avoid reactions with alkali oxide and reactions under the influence of a reducing atmosphere when the bricks are put into service.

At a relatively high overall porosity, the bricks have a fine pored formation in the region of the matrix containing the fine grained calcium aluminate of the starting material and the calcium aluminate-containing binder, which is produced from the calcium aluminate hydrate by firing the brick. The bricks have a low permeability to gas, a property that has a good effect on improving the infiltration resistance of the bricks.

The tin bath bottom brick and the process for its manufacture according to the invention are explained in detail with the following example. For comparison purposes, the properties of a commercially available tin bath bottom brick based on fireclay are listed.

EXAMPLE

Sintered calcium aluminate with the following properties was used as the starting material to manufacture the bricks:

71% by weight $Al_2O_3$
28% by weight CaO
0.1% by weight $SiO_2$.

The weight per unit of volume was 1.35 g/cm³ and the porosity was 53% by volume, measured for a grain size ranging from 2-6 mm.

A mixture was prepared from the sintered calcium aluminate having a grain size ranging from 0.1-3 mm and finely ground calcium aluminate having a grain size below 0.1 mm, of which 85% by weight was below 0.04 mm and exhibited a Blaine value of 3500 cm²/g. Water was added in a conventional amount, to permit shaping into bricks, and the resultant mixture was compressed into bricks. The following table shows the composition and the properties of the hydraulically bonded and subsequently dried bricks, fired at 1100° C. The tin bath bottom brick according to the invention is characterized by an especially low value for thermal expansion, permeability to gas and thermal conductivity.

TABLE

| calcium aluminate, sintered | 1-3 mm | | 30% by wt. |
|---|---|---|---|
| | 0.1-1 mm | | 50% by wt. |
| | <0.1 | | 20% by wt. |
| sulfite spend liquor (ratio with water 1:1) | | | +2.5% by wt. |
| water | | | +8% by wt. |

| Properties | 110° C. | 1100° C. | Conventional brick |
|---|---|---|---|
| weight per unit of volume g/cm³ | 1.77 | 1.65 | 2.18 |
| porosity % by volume | 38 | 43 | 19 |
| cold compression strength N/mm² | 30 | 60 | 40 |
| thermal expansion % at 1100° C. | | +0.5 | +0.6 |
| gas permeability nPm | | 0.1 | 0-3 |
| thermal conductivity W/Km 400° C. | | 0.5 | 1.2 |
| 700° C. | | 0.5 | 1.3 |
| 1100° C. | | 0.5 | 1.4 |
| $Al_2O_3$ content % | 71 | | 43 |
| $SiO_2$ content % | | | 52 |
| CaO content % | 28.5 | | |

TABLE-continued

| constancy of volume (RB) | |
|---|---|
| 900° C./5 hours | −0.2 |
| 1100° C./5 hours | +0.1 |

We claim:

1. A process for manufacturing a refractory, fireproof brick, which comprises mixing coarse grains of calcium aluminate having a grain size of 0.1 to 3 mm and fine grains of calcium aluminate having a grain size of less than 0.1 mm to prepare a mixture, wherein the fine grains are mixed in an amount of 10 to 30% by weight based on the weight of the mixture; adding water to the mixture; shaping the resultant mixture; storing the shaped mixture in a moist environment to cure the shaped mixture; drying the cured mixture; and firing the dried mixture.

2. The process of claim 1, wherein the amount of the fine grains is 15 to 25% by weight.

3. The process of claims 1, wherein the coarse and fine grains of calcium aluminate are supplied to the mixture as a calcium aluminate-containing oxidic starting material that contains 20 to 60% by weight CaO, 40 to 80% by weight $Al_2O_3$ and a maximum of up to 10% by weight in total of FeO, $Fe_2O_3$, $SiO_2$, MgO and $TiO_2$, based on the weight of the starting material.

4. The process of claim 1, wherein the starting material contains less than 1.5% by weight of the $SiO_2$, and less than 1.5% by weight of iron oxide calculated as $Fe_2O_3$.

5. A refractory, fireproof brick comprising 70 to 90% by weight of coarse grains of calcium aluminate having a grain size of 0.1 to 3 mm, 10 to 30% by weight of fine grains of calcium aluminate having a grain size of less than 0.1 mm, based on the weight of the brick, and a calcium aluminate binder.

6. A dried brick-shaped molding comprising 70 to 90% by weight of coarse grains of calcium aluminate having a grain size of 0.1 to 3 mm, and 10 to 30% by weight of fine grains of calcium aluminate having a grain size of less than 0.1 mm, based on the dry weight of the molding, wherein the coarse and fine grains are hydraulically bonded to each other.

7. The brick of claim 5, wherein the fine grains have a grain size of 0.000 to less than 0.1 mm.

8. The brick of claim 5, wherein the amount of the fine grains is 15 to 25% by weight.

9. The brick of claim 5, wherein the coarse and fine grains are sintered or fused calcium aluminate.

10. The brick of claim 5, wherein the coarse and fine grains are porous.

11. The molding of claim 6, which is fired.

* * * * *